Jan. 1, 1963
T. G. BERNHARDI
3,071,447
HYDRAULIC CLASSIFIER
Filed Sept. 9, 1958
2 Sheets-Sheet 1
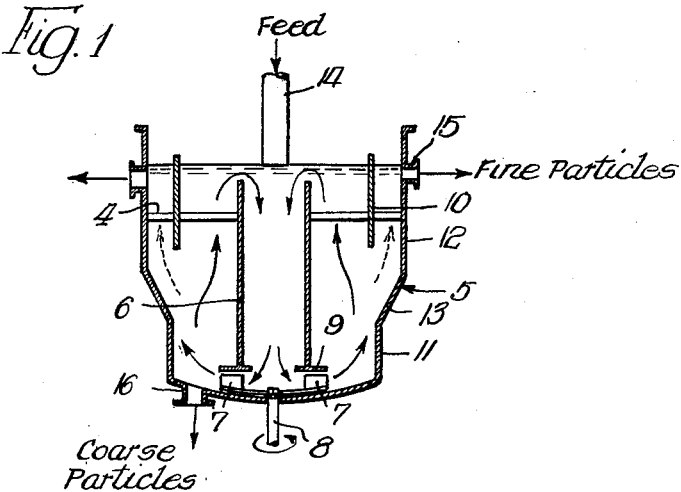
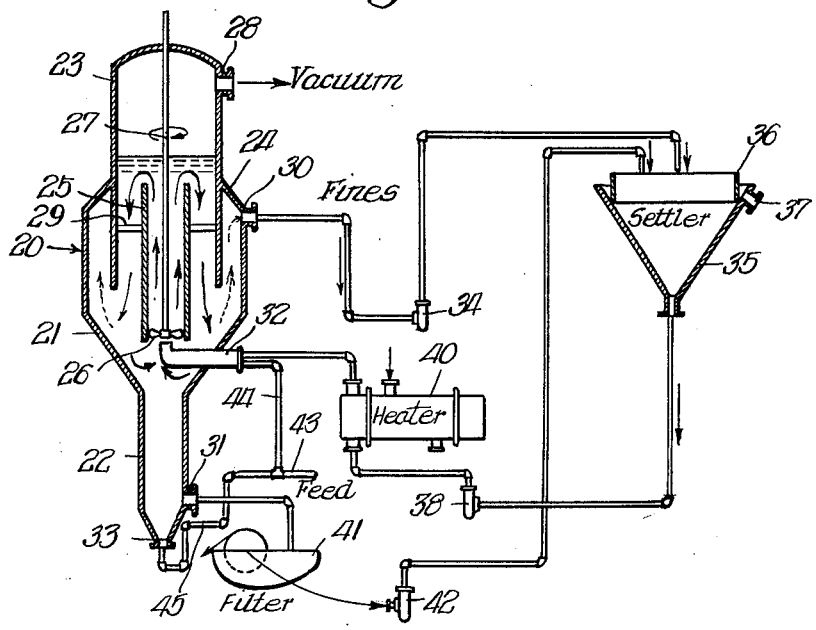
INVENTOR.
Tom G. Bernhardi,
BY
Cromwell, Greist + Warden
Attys

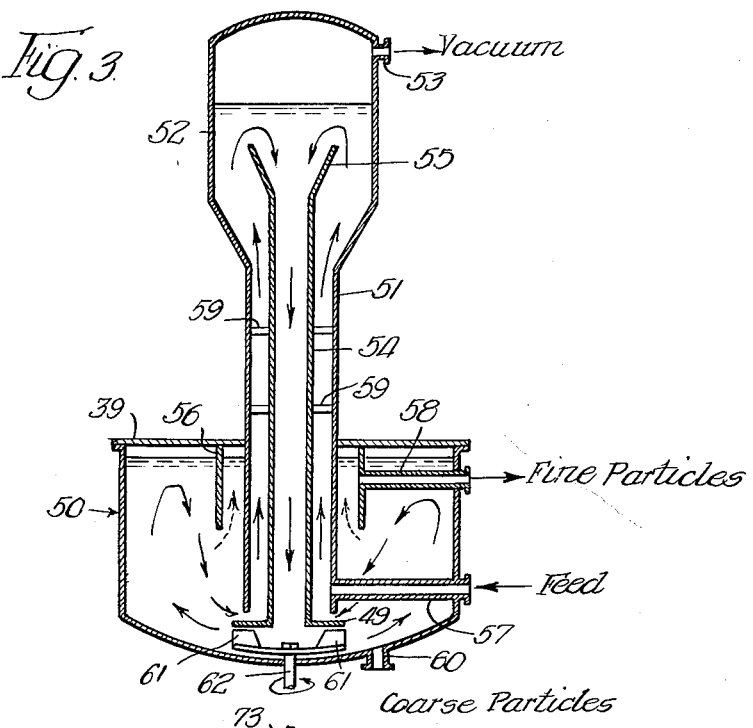
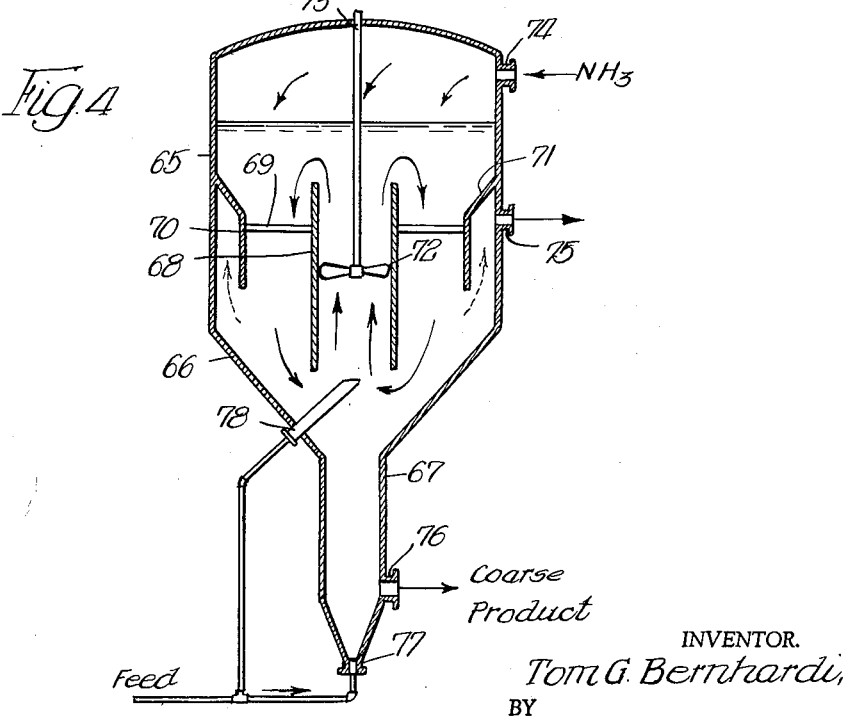

United States Patent Office 3,071,447
Patented Jan. 1, 1963

3,071,447
HYDRAULIC CLASSIFIER
Tom G. Bernhardi, Harvey, Ill., assignor to Whiting Corporation, a corporation of Illinois
Filed Sept. 9, 1958, Ser. No. 759,923
10 Claims. (Cl. 23—273)

This invention relates, generally, to innovations and improvements in hydraulic classifiers, and particularly to such classifiers that may be used simultaneously both as classifiers and as crystallizers.

The hydraulic classifiers of the present invention are characterized by having, in combination: (1) mechanical circulating means for circulating slurry within a vessel in a generally toroidal flow pattern with the principal axis of the pattern being approximately vertical; (2) at least one elutriation column in the vessel with at least a substantial portion of the height thereof being a channel or flow-path of uniform or constant cross-section, and with the bottom end of the column or channel being in proximity to the periphery of the slurry flow pattern for communicating therewith; (3) an outlet for the column located at least a substantial distance above the bottom of the uniform channel therein, and through which slurry may be withdrawn at a rate sufficient to establish elutriating conditions in the uniform channel portion of the column; and, (4) means connected with such outlet for withdrawing slurry at such a rate. It has been found that the channel of uniform cross-section within the elutriation column must have a minimum height of 3 inches, and preferably it is 12 inches or more in height.

In a preferred construction the hydraulic classifiers of the present invention have a draft tube disposed coaxially within a vessel of generally cylindrical shape having a generally concave or conical bottom portion, with mechanical flow-producing and controlling means disposed in or at the bottom of the draft tube for creating and maintaining in cooperation with the draft tube a substantially closed (i.e. toroidal) liquid flow circuit which flows in one direction through the draft tube and in opposite direction along the outside thereof, and by the presence of an elutriation column coaxially disposed with respect to the draft tube and having a substantially uniform annular cross-section which provides a quiescent zone, with the bottom end of the elutriation column being in communication with the flow circuit at the fringe thereof.

In hydraulic classifiers made according to the present invention, the smallest sized particles can be efficiently removed from a slurry or suspension containing particles in a wide range of sizes. If desired, by providing a product classification leg at the bottom of the vessel, the coarsest or largest particles may also be efficiently removed. The hydraulic classifiers or hydraulic classifier crystallizers of the present invention differ greatly in their operation from the conventional hindered settling classification that occurs in conventional hydraulic classifiers. As is well known, conventional hindered settling classification requires that the hydraulic current be sufficient to fluidize the coarsest particles. This limits the classification underflow (i.e. coarse fraction) to those particles which have free settling rates equal to or greater than the upward velocity of the hydraulic flow needed to fluidize the coarsest particles. By reason of this inherent limitation, it is frequently necessary to utilize two or more stages of conventional classification in order to make a separation of fine crystals or particles at the desired point.

In the hydraulic classifier of the present invention, there is introduced a novel feature in fluidized bed classification which serves to avoid the need for multiple stage treatment, while at the same time providing a sharp sizing separation of fine particles. In the case of a hydraulic classifier crystallizer built in accordance with the present invention, controlled circulation of liquid and crystals within the apparatus serves to bring growing crystals into a zone of origin of super-saturation while simultaneously creating a fluidized bed for classification and separation of fine crystals. Thus, the larger particles or crystals are fluidized by the flow of slurry to and from the zone of super-saturation. Adjacent to, and on the fringe of, the stream of circulating slurry, there is a quiescent zone within the elutriation column from the adjacent top of which the smallest particles or crystals can be withdrawn to the exclusion of larger sized particles or crystals.

The apparatus of the present invention lends itself to hydraulic classifier crystallizers wherein crystallization is produced by: (1) evaporation; (2) the lowering of the solubility of the solid phase by the addition of other components to the solution (i.e. salting out process); (3) cooling, and (4) by the addition to the solution of one or more reactants which result in the formation of the solid being crystallized. One embodiment of the invention has particular utility to a crystallization process wherein super-saturation originates at a vapor-liquor interface which is under sub-atmospheric pressure and wherein the retention time necessary for growth of the crystals to desired size is relatively long.

An important object of the invention is the provision of a hydraulic classifier, and also a hydraulic classifier crystallizer, useful for both continuous and batch type operations, and for processing large quantities of material, wherein mechanical circulating means creates and maintains a generally toroidal flow pattern having a velocity more than sufficient to suspend or fluidize the largest particles, and having a quiescent zone within an elutriation column of substantially uniform cross-section for a substantial height with the bottom end thereof in communication with the periphery or fringe of the flow pattern.

Another important object of the invention is the provision of such a hydraulic classifier or hydraulic classifier crystallizer which is economical to build, install, maintain and operate.

Still another important object of the invention is the provision of such a hydraulic classifier or hydraulic classifier crystallizer which is versatile with respect to the materials which may be processed in it, and the rates and manner in which it may be operated.

Another important object of the invention is the provision of a hydraulic classifier, or hydraulic classifier crystallizer, which is characterized by operating efficiently to remove the smallest or finest particles or crystals from a slurry or suspension containing particles or crystals having a wide range of particle sizes.

Another object of the invention is the provision of a hydraulic classifier or hydraulic classifier crystallizer which operates efficiently to remove both the smallest and the largest sized particles from a slurry or suspension containing particles or crystals of a range of sizes.

Certain other objects of the invention will, in part, be obvious and will in part appear hereinafter.

For a more complete understanding of the nature and scope of the invention, reference may now be had to the following detailed description thereof, taken in connection with the accompanying drawings wherein:

FIG. 1 is a vertical sectional view through a hydraulic classifier forming one embodiment of the invention;

FIG. 2 is a vertical sectional view through a hydraulic classifier crystallizer forming another embodiment of the invention showing diagrammatically associated apparatus for operation therewith;

FIG. 3 is a vertical sectional view through a hydraulic classifier crystallizer forming another embodiment of the invention and having particular utility in a crystallization process wherein super-saturation occurs at a vapor-liquid interface which is under sub-atmospheric pressure or vacuum and wherein the retention time for growth of crystals to the desired size is relatively long, thereby requiring a considerable retention volume; and FIG. 4 is a vertical sectional view through a hydraulic classifier crystallizer wherein the crystals may be formed at a vapor-liquid interface by absorption of a gas with a component within the liquid.

Referring to FIG. 1, the hydraulic classifier shown therein comprises a vessel 5 which is open at the top, but which could be closed if desired. The vessel 5 is circular in cross-section. A draft tube 6 is suitably supported in known manner (e.g. by spokes 4) coaxially within the vessel 5 with the bottom end thereof raised from the concave bottom thereof. The normal liquid level is above the upper end of the draft tube as indicated in FIG. 1. Mechanical circulating means in the form of an impeller 7 is disposed adjacent the bottom end of the draft tube 6 and is arranged to be driven in known manner by means of a shaft 8 projecting through the bottom of the vessel. The bottom end of the draft tube 6 is provided with a plate 9 with a central aperture over the impeller. A baffle in the form of an open-ended cylinder 10 supported in known manner such as by spokes 4, is provided within the upper cylindrical portion of the vessel 5. The baffle 10 serves to define an elutriation column with the adjacent cylindrical wall of the vessel 5, such column having a substantially uniform annular cross-section from bottom to top.

The smaller diameter bottom portion 11 of the vessel 5 is joined to the larger diameter upper portion 12 thereof by means of a frusto-concical portion 13. It will be seen that the baffle 10 is disposed approximately over the frusto-conical portion 13. The purpose and advantage of this particular arrangement will be mentioned in connection with the description of the operation of the apparatus.

The material to be processed or classified, e.g. a slurry of ore, salt, etc. is introduced into the vessel 5 through a feed inlet 14. This feed inlet could also be located at some other portion of the apparatus just so long as it does not interfere with the operation thereof. The fines are removed from the vessel 5 adjacent the upper end of the elutriation column through one or more fines outlets 15 while the coarse particles are removed from the bottom through the outlet 16.

In operation, the vessel 5 is filled approximately to the level indicated with the material to be processed while the impeller 7 is in operation. A closed flow circuit will be created and maintained by the impeller 7 the toroidal pattern of which circuit in FIG. 1 is indicated by the solid arrows. The liquid flows downwardly through the draft tube 6 and then spreads outwardly over the bottom under the influence of the impeller 7, and is deflected by the side walls of the small diameter portion 11 so as to flow upwardly between the baffle 10 and the outside of the draft tube 6. At the upper end of the draft tube the flow pattern is inwardly over the upper end of the draft tube as indicated by the arrows. The impeller 7 is driven at such a rate that the velocity of flow will be sufficient to suspend the largest crystals or particles but insufficient to prevent or destroy the generally quiescent zone within the elutriation column formed between the baffle 10 and the vertical wall of the vessel 5. Under these conditions, the bottom end of the baffle 10 and the bottom end of the elutriation column will be in communication with the closed flow circuit but at the outer fringe thereof. Additional slurry or material is fed into the vessel 5 at a rate or in such quantities as to maintain the operating level therein and compensate for material withdrawn through the fines outlets 15 and the coarse particles outlet 16.

Since the entrance or bottom end of the elutriation column is on the fringe or periphery of the main closed circuit path of flow, it is not subject to the flow velocities thereof and few if any of the larger particles or crystals reach this bottom or entrance end. On the contrary, only the intermediate sized particles or crystals and smaller are diverted toward the elutriation column. Due to the removal of fines through the outlet 15 at a predetermined rate a teeter bed is established within the quiescent zone in the elutriation column by the upward hydraulic flow therein. In this teeter bed particles of various sizes become stratified according to size with only the desired fine particles reaching the top. The broken line arrows indicate the flow into the bottom of the elutriation column.

Referring to FIG. 2, the hydraulic classifier crystallizers shown therein comprises a main tank or vessel 20 which is cylindrical in shape at its mid-portion with a conical bottom 21 from the lower end of which depends a column 22 of reduced cross section, constituting a product classification leg as will hereinafter be explained. A cylindrical column of larger diameter 23, which is closed at the top, projects both above, and downwardly into, the vessel 20, as shown. A frusto-conical portion 24 serves to connect and join the upper end of the vessel 20 to the side or exterior of the column 23 for supporting the latter. A draft tube 25 is suitably supported in known manner as by spokes 29 coaxially within the vessel 20 and column 23 and is provided with a propeller 26 which is suitably supported on a shaft 27. The shaft 27 is driven in known manner as by an electric motor. The propeller 26 serves to create and maintain a forced and closed liquid flow circuit of toroidal pattern which passes upwardly through the draft tube 25 and then reverses itself and flows downwardly along the exterior thereof, being diverted by the conical bottom 21 so as to return back into the bottom of the draft tube 25. If desired, the action of the propeller 26 can be reversed so that the direction of flow in the toroidal pattern is reversed. It will be seen that the lower portion of the column 23 which is housed within the vessel 20 constitutes a cylindrical baffle which in cooperation with the cylindrical side wall portions of the vessel 20 serve to define an elutriation column of substantially uniform annular cross section from bottom to the top. As in the case of the apparatus shown and described in connection with FIG. 1, the bottom end of the elutriation column is not subject to the full current flow of the main closed circulation path best only subject to the fringes thereof.

The hydraulic classifier crystallizer of FIG. 2 has a vapor outlet connection 28 at the upper end thereof by which vapor may be withdrawn from the headspace above the liquid level to a condenser or the like, in well known manner. The vessel 20 is provided with at least one fines outlet connection 30 adjacent the upper end of the elutriation column, and a coarse particle or crystal outlet connection 31 adjacent the bottom end of the leg 22. There is a feed connection 32 which projects inwardly through the conical bottom 21 with the inner end being upturned beneath the draft tube 25. A second feed is indicated at 33 being at the bottom end of the depending column or classification leg 22.

In operation: the fines stream is withdrawn from the outlet connection or connections 30 and delivered by means of the centrifical pump 34 to the top of a settler 35 of known type. The pump 34 serves to control the rate of upward flow in the elutriation column so that only particles of at least a certain predetermined fineness are withdrawn. It will be seen that, if desired, suitable valves may be used to control the flow rate. A cylindrical baffle 36 is set into the upper end of the settler so as to extend below the clear liquor outlet connection 37. A pump 58 delivers solution containing settled fines from the bottom of the settler 35 to a heat exchanger or heater 40 wherein the temperature of the solution is raised sufficiently to bring about solution of the fine crystals before it is delivered into the feed inlet connection 32.

Solution containing the large product crystals is removed from the connection 31 into a filter of known type indicated at 41 with the crystals being removed as indicated and the filtrate being transferred by means of a pump 42 through a line which delivers it into the upper end of the settler 35. Feed solution is introduced through a feed line 43 into the vessel 20 by way of the inlet connection 32 through a line 44 and by way of the classification leg 22 through the line 45. The volume of the feed passing upwardly through the connection 33 is sufficient to fluidize the fastest settling crystals and thereby establish a teeter bed in which crystals are stratified according to size. The larger crystals are withdrawn from the base of this leg through the connection 31, as explained, while all other sizes are returned to the main body of the liquid for further circulation and growth.

Referring now to the hydraulic classifier crystallizer, shown in FIG. 3, there is a main tank or vessel 50 having a generally concave bottom and being open at the top. A relatively tall cylindrical column 51 is suitably supported such as by cover 39 over the center of the vessel 50 with the open end of the column 51 being provided with an annular flange 49 spaced just above an impeller 61. At its top, the column 51 merges into a dome 52 which is enclosed and has adjacent the top thereof a vapor outlet connection 53. This may be connected to a vacuum pump or other source of vacuum as indicated.

Within the column 51 there is concentrically disposed and supported as by spokes 59 a draft tube 54 the bottom end of which extends beneath the lower end of the column 51 and the upper end of which is outwardly flared at 55.

A baffle in the form of a cylinder 56, which may be open or closed at the top, is supported around the column 51 so as to project above the liquid level within the tank 50 and down into the liquid a substantial distance as shown. This baffle 56 defines, in cooperation with the exterior of the column 51 an elutriation column of substantially uniform annular cross section. There is a feed inlet connection 57 extending through the side wall of the vessel by means of which feed solution may be introduced into the apparatus. At least one fines outlet connection 58 leads from the upper end of the elutriation column and passes outwardly through the wall of the vessel 50. The coarse product may be withdrawn from the vessel through the coarse outlet connection 60 in the bottom of the vessel 50.

In order to provide and maintain a controlled flow path or pattern through the apparatus, an impeller 61 is arranged to be driven by means of a drive shaft 62 in known manner.

In operation, the apparatus is filled with saturated solution to the level indicated, within the large tank 50 and the enlarged portion 52 on the column 51. The latter level may be maintained since the headspace above it will be under reduced atmospheric pressure. The arrows indicate the flow path of generally toroidal pattern which is established and created by the impeller 61 and it will be seen that in one direction it passes downwardly through the draft tube 54 and in the opposite vertical direction it passes upwardly through the annular space between the draft tube and the column 51. At the bottom end of the draft tube the liquid spreads out along the bottom concave walls of the vessel 50, upwardly along the vertical side walls thereof, and then reverses its flow and passes downwardly and upwardly into the bottom end of the column 51. As in the case of the embodiments described above in connection with FIGS. 1 and 2, the bottom end of the elutriation column and the baffle 56 is off to one side or on the fringe of the main flow path so that it is not subjected to full flow velocity. This latter velocity is at least sufficient or greater than is required to suspend the largest sized particles. However, the main velocity or flow does not act upon the bottom end of the elutriation column and therefore only intermediate sized and finer or smaller crystals are diverted upwardly into it. It will be seen that a teeter bed is established within the elutriation column so that the particles will stratify therein in accordance with their size with only the finest particles being at the top. These are withdrawn through the connection 58.

The apparatus described in FIG. 3 has special utility for processing solutions for crystallization and classification wherein it is desired to create super-saturation at a vapor-liquor interface under sub-atmospheric pressure and where long retention times for crystal growth are required. By reason of the construction shown in FIG. 3, only a small portion of the apparatus is subjected to sub-atmospheric pressure and thereby the cost of the apparatus is substantially less than what it would be if a large portion of the apparatus was subject to reduced pressure on the interior.

The vessel 50 provides the desired large retention volume while the column 51 and long draft tube 54 provide for the elongated flow path. This particular hydraulic classifier crystallizer would have application for example in connection with the crystallization of a material such as borax.

Still another form of hydraulic classifier crystallizer is shown in FIG. 4 wherein there is a cylindrical tank or vessel 65 which is closed at the top and which is provided with a conical bottom portion 66. A classification leg in the form of a reduced diameter column 67 depends from the bottom of the conical bottom 66. On the interior, the vessel 65 is provided with a draft tube 68 suitably supported as by spokes 69, and outwardly therefrom with a cylindrical baffle 70 the upper end of which is joined to the side wall of the vessel 65 by means of the annular skirt portion 71. A propeller 72 is located in the draft tube 68 and is supported on a shaft 73 projecting from the top of the apparatus by which it is suitably driven in known manner.

There is vapor connection 74 adjacent the top of the vessel 65, a fines outlet connection 75 adjacent the upper end of the bottom end of the leg 67, a feed inlet connection 77 in the bottom end of the leg 67 and a second feed inlet connection 78 in the conical bottom portion 66.

The operation of the apparatus shown in FIG. 4 will be described in connection with the formation of sodium sulphate crystals and the classification thereof. A feed stream of saturated sodium sulphate solution is introduced through the feed line with the portion being introduced through the bottom connection 77 being sufficient to create an upward hydraulic flow adequate to establish a teeter bed within the classification leg 67. Ammonia gas is introduced through the vapor connection 74 into the headspace above the liquid level within the vessel 65. The propeller 72 establishes the flow path indicated by the solid arrows which correspond generally to the flow path described above in connection with the apparatus shown in FIG. 2. Due to the absorption of the ammonia into the sodium sulphate solution at the vapor-liquid interface, a super-saturated condition is established which results in the growth of crystals in this region. Fine crystals are removed by means of the elutriation column formed by the cylindrical baffle 70, while the coarse product crystals are removed through the outlet connection 76.

While the apparatus described above in connection with the drawings represent preferred embodiments of the invention, certain changes may be made therein while retaining the benefits of the invention. For example, the vessels need not be cylindrical, and the elutriation columns need not be cylindrical or coaxially disposed within the vessels or with respect to the draft tubes. The elutriation columns do not have to be of uniform or constant cross-section from the bottom to top so long as they have such a uniform cross-section of substantial height, i.e. at least 3 inches and preferably 12 or more inches in height. Such minimum heights will, in operation, provide zones of liquid flow in which predetermined upward liquid velocities can be maintained for times sufficient to permit classification. While draft tubes help materially in establishing and controlling the toroidal flow patterns within the vessels, such flow patterns can be approximated by propellers alone coaxially disposed in the vessels.

Since certain further changes in the foregoing embodiments will be apparent to those skilled in the art, and other embodiments of the invention may be made without departure from the spirit and scope of this invention, all matters described above or shown in the accompanying drawing are intended to be interpreted as illustrative and not in a limiting sense.

What is claimed as new is:

1. A hydraulic classifier comprising a vessel having a mechanical circulating means for circulating slurry within said vessel in a generally toroidal flow pattern with the principal axis of said pattern being approximately vertical, at least one elutriation column in said vessel having a channel of uniform cross-section for at least a substantial portion of its height, said channel having an inlet near its lower end for communicating with slurry near the periphery of said toroidal flow pattern and an outlet at least a substantial height above the lower end of said channel of uniform cross-section, said channel defining a flow path for a portion of the slurry separate and distinct from said toroidal flow pattern and extending from said channel inlet to said channel outlet, and means communicating with said outlet for said channel for withdrawing slurry therefrom at a predetermined rate, said rate being selected to establish a flow velocity in said column to suspend only particles finer than a predetermined maximum size.

2. A hydraulic classifier comprising a vessel, mechanical circulating and flow control means including a draft tube for circulating slurry within said vessel in a generally toroidal flow pattern with the principal axis of said pattern being approximately vertical, at least one elutriation column in said vessel having a channel of uniform cross-section for at least a substantial portion of its height, said channel having an inlet near its lower end for communicating with slurry near the periphery of said toroidal flow pattern and an outlet at least a substantial height above the lower end of said channel of uniform cross-section, said channel defining a flow path for a portion of the slurry separate and distinct from said toroidal flow pattern and extending from said channel inlet to said channel outlet, and means communicating with said outlet for said channel for withdrawing slurry therefrom at a predetermined rate, said rate being selected to establish a flow velocity in said column to suspend only particles finer than a predetermined maximum size.

3. A hydraulic classifier comprising, in combination, a vessel which is cylindrical for at least a portion of its height, a draft tube coaxially disposed in said cylindrical portion of said vessel, cylindrical baffle means within said cylindrical portion coaxially surrounding said draft tube and defining one cylindrical wall of an elutriation column having a substantially uniform annular cross-section for at least a substantial portion of its height, mechanical circulating means disposed in operative relationship with said draft tube for maintaining a generally toroidal flow pattern of slurry within said vessel which passes through said draft tube in one direction and along the exterior of said draft tube in the opposite direction, the bottom end of said baffle means being located on the periphery of said flow pattern, a fines outlet adjacent the upper end of said elutriation column, a discharge outlet for coarse particles located at a level below said draft tube, and means connected with said fines outlet for withdrawing slurry therefrom at a rate selected to establish an upward flow velocity in said column sufficient to suspend only particles finer than a predetermined maximum size.

4. The apparatus called for in claim 3 wherein a column of relatively small cross-section depends from the bottom of said vessel and constitutes a classification leg, said column having a feed inlet in the bottom end thereof and a coarse particles outlet adjacent the bottom end.

5. A hydraulic classifier crystallizer comprising, in combination, a closed vessel the lower portion of which is cylindrical, a draft tube coaxially disposed in said lower portion, cylindrical baffle means within said lower portion coaxially surrounding said draft tube and defining one cylindrical wall of an elutriation column having a substantially uniform cross-section for at least a substantial portion of its height, mechanical circulating means disposed in operative relationship with said draft tube for maintaining a generally toroidal flow pattern of slurry within said vessel which passes through said draft tube in one direction and along the exterior thereof in the opposite direction, the bottom end of said baffle being disposed on the periphery of said flow pattern, a fines outlet adjacent the upper end of said elutriation column, a discharge outlet for coarse particles located at a level below said draft tube, a feed inlet connection for introducing material into said vessel, a vapor connection adjacent the upper closed end of said vessel, and slurry withdrawing means connected with said fines outlet for withdrawing slurry at a rate creating a flow velocity in said elutriation column sufficient to suspend only particles finer than a predetermined maximum size.

6. A hydraulic classifier comprising, in combination, a cylindrical vessel having a concave bottom, a reduced diameter bottom portion the top of which is connected to the upper portion by an integral frusto-conical portion, a draft tube coaxially disposed within said vessel, cylindrical baffle means within the upper portion of said vessel coaxially surrounding said draft tube and defining the inner cylindrical wall of an elutriation column having a substantially uniform annular cross-section and the outer wall thereof being the wall of said vessel, mechanical circulating means disposed in operative relationship with said draft tube for maintaining a substantially closed liquid flow circuit of liquid within said vessel which passes downwardly through said draft tube outwardly over the bottom of said vessel and upwardly past the sides of said reduced diameter portion and along the exterior of said draft tube, the bottom end of said cylindrical baffle being located above said reduced diameter portion of the vessel and on the fringe of said flow circuit, a fines outlet adjacent to the upper end of said elutriation column, a discharge outlet for coarse particles in the bottom of said vessel, and slurry withdrawing means connected with said fines outlet for withdrawing slurry at a rate creating a flow velocity in said elutriation column sufficient to suspend only particles finer than a predetermined maximum size.

7. A hydraulic classifier crystallizer comprising in combination, a vessel at least the upper portion of which is cylindrical, a column of somewhat smaller diameter than said cylindrical upper portion coaxially disposed with respect to said vessel with the upper portion of said column being closed and projecting above said vessel and with the lower portion of said column being open and projecting down into said vessel, a draft tube coaxially disposed within said vessel and within said lower portion of said column, mechanical circulating means disposed in operative relationship with said draft tube for maintaining a substantially closed liquid flow circuit for liquid within said vessel which passes through said draft tube in one direction and along the exterior thereof in the opposite direction, the space between said lower portion of said large column and the opposing wall of said vessel constituting an elutriation column of substantially uniform annular cross-section, a fines outlet adjacent the upper end of said elutriation column, a coarse particles outlet in the bottom of said vessel, a vapor connection adjacent the top of said column, and slurry withdrawing means connected with said fines outlet for withdrawing slurry at a rate creating a flow velocity in said elutriation column sufficient to suspend only particles finer than a predetermined maximum size.

8. The apparatus called for in claim 7 wherein a frusto-conical member joins the upper end of said vessel with the exterior of said column intermediate the top and bottom of the latter.

9. A hydraulic classifier crystallizer comprising, in combination, a cylindrical vessel having a conical bottom, a column of small cross-section depending from the lower end of said conical bottom and constituting a classification leg, a column of relatively large cross-section coaxially disposed with respect to said vessel with the upper portion closed at the top and projecting above said vessel so as to form a dome and with the lower portion open at the bottom and projecting down into said vessel, a draft tube coaxially disposed within said vessel and within said lower portion of said large column, mechanical circulating means disposed in operative relationship with said draft tube for maintaining a substantially closed liquid flow circuit which passes through said draft tube in one direction and along the exterior thereof in the opposite direction, the space between said lower portion of said large column and the wall of said vessel forming an elutriation column of substantially uniform annular cross-section from bottom to top, a fines outlet adjacent the upper end of said elutriation column, a coarse particles outlet adjacent the lower end of said classification leg, a feed inlet connection for introducing feed into said vessel, a vapor outlet connection adjacent the closed top of said large column, and slurry withdrawing means connected with said fines outlet for withdrawing slurry at a rate creating a flow velocity in said elutriation column sufficient to suspend only particles finer than a predetermined maximum size.

10. A hydraulic classifier crystallizer comprising, in combination, a cylindrical vessel, a column having an enclosed dome at the upper end and projecting coaxially a substantial distance above said vessel with the lower end open and projecting down into said vessel, an elongated draft tube disposed coaxially within said column with upper end projecting up into said dome and with its lower end terminating a short distance above the bottom of said vessel, a cylindrical baffle coaxially surrounding said column and projecting above the normal liquid level in said vessel and a substantial distance below the liquid level and defining the outer wall of an elutriation column having a substantially uniform annular cross-section, mechanical circulating means disposed in operative relationship with said draft tube for maintaining a substantially closed liquid flow circuit which passes through said draft tube in one direction and in between the exterior of said draft tube and the interior of said column in the opposite direction, the bottom and side walls of said vessel forming a portion of said flow circuit with the bottom end of said baffle being located above the bottom end of said draft tube and on the fringe of said flow circuit, a fines outlet leading from adjacent the upper end of said elutriation column, a discharge outlet for coarse particles in the bottom of said vessel, a vapor connection in the top of said dome, and slurry withdrawing means connected with said fines outlet for withdrawing slurry at a rate creating a flow velocity in said elutriation column sufficient to suspend only particles finer than a predetermined maximum size.

References Cited in the file of this patent

UNITED STATES PATENTS

| | | |
|---|---|---|
| 1,539,746 | Kleinbentink | May 26, 1925 |
| 2,708,517 | Evans | May 17, 1955 |
| 2,883,273 | Saeman | Apr. 21, 1959 |